(12) United States Patent
Medvedev et al.

(10) Patent No.: US 11,898,415 B2
(45) Date of Patent: *Feb. 13, 2024

(54) CEMENT COMPOSITIONS AND METHODS

(71) Applicant: Schlumberger Technology Corporation, Sugar Land, TX (US)

(72) Inventors: Anatoly Vladimirovich Medvedev, Moscow (RU); Dominic Vincent Perroni, Houston, TX (US); Laure Martin-Al-Khatib, Bourg la Reine (FR); Adam Ethan Keilers, Richmond, TX (US); Petr Kolchanov, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/254,418

(22) PCT Filed: Jun. 28, 2019

(86) PCT No.: PCT/US2019/039720
§ 371 (c)(1),
(2) Date: Dec. 21, 2020

(87) PCT Pub. No.: WO2020/009918
PCT Pub. Date: Jan. 9, 2020

(65) Prior Publication Data
US 2022/0136365 A1 May 5, 2022

Related U.S. Application Data

(60) Provisional application No. 62/693,173, filed on Jul. 2, 2018.

(51) Int. Cl.
*E21B 33/14* (2006.01)
*C09K 8/467* (2006.01)
(Continued)

(52) U.S. Cl.
CPC .............. *E21B 33/14* (2013.01); *C04B 28/02* (2013.01); *C09K 8/467* (2013.01); *E21B 33/138* (2013.01)

(58) Field of Classification Search
None
See application file for complete search history.

(56) References Cited

U.S. PATENT DOCUMENTS

| 4,883,125 A | 11/1989 | Wilson et al. |
| 5,076,852 A | 12/1991 | Bloys et al. |

(Continued)

FOREIGN PATENT DOCUMENTS

| EP | 0224298 A2 | 6/1987 |
| EP | 0605113 A1 | 7/1994 |

(Continued)

OTHER PUBLICATIONS

International Search Report and Written Opinion issued in International Patent Application No. PCT/US2020/039790 dated Oct. 12, 2020; 10 pages.

(Continued)

*Primary Examiner* — Anuradha Ahuja

(57) ABSTRACT

Cement slurries are prepared that comprise water, a hydraulic cement and particles of an oil-absorbent material. The particles are present in an amount sufficient to alter a property of a non-aqueous drilling fluid. The cement slurry is placed in a subterranean well, whereupon the slurry contacts residual drilling fluid on casing and formation (Continued)

surfaces. The oil-absorbent material in the cement slurry may reduce the mobility of the drilling fluid, thereby improving zonal isolation.

16 Claims, 4 Drawing Sheets

(51) Int. Cl.
  *E21B 33/138* (2006.01)
  *C04B 28/02* (2006.01)

(56) References Cited

U.S. PATENT DOCUMENTS

| | | | |
|---|---|---|---|
| 5,213,160 | A | 5/1993 | Nahm et al. |
| 5,295,543 | A | 3/1994 | Terry et al. |
| 5,370,185 | A | 12/1994 | Cowan et al. |
| 5,382,290 | A | 1/1995 | Nahm et al. |
| 5,499,677 | A | 3/1996 | Cowan |
| 5,782,300 | A | 7/1998 | James et al. |
| 6,776,235 | B1 | 8/2004 | England |
| 6,809,067 | B2 | 10/2004 | Von Krosigk |
| 6,832,651 | B2 | 12/2004 | Ravi et al. |
| 6,902,001 | B2 | 6/2005 | Dargaud et al. |
| 7,143,827 | B2 | 12/2006 | Chatterji et al. |
| 7,178,597 | B2 | 2/2007 | Reddy et al. |
| 7,331,391 | B2 | 2/2008 | Keese et al. |
| 7,530,396 | B1 | 5/2009 | Reddy et al. |
| 7,537,054 | B2 | 5/2009 | Reddy et al. |
| 7,607,484 | B2 | 10/2009 | Roddy et al. |
| 8,030,253 | B2 | 10/2011 | Roddy et al. |
| 8,123,852 | B2 | 2/2012 | Reddy et al. |
| 8,236,879 | B2 | 8/2012 | Michaux et al. |
| 8,469,095 | B2 | 6/2013 | Le Roy-Delage et al. |
| 8,517,101 | B2 | 8/2013 | Michaux et al. |
| 8,551,244 | B2 | 10/2013 | Le Roy-Delage et al. |
| 8,800,656 | B2 | 8/2014 | Le Roy-Delage et al. |
| 8,844,628 | B2 | 9/2014 | Le Roy-Delage et al. |
| 9,222,011 | B2 | 12/2015 | Le Roy-Delage et al. |
| 9,228,122 | B2 | 1/2016 | Chatterji et al. |
| 9,683,161 | B2 | 6/2017 | Le Roy-Delage et al. |
| 9,701,881 | B2 | 7/2017 | Morris et al. |
| 10,161,222 | B2 | 12/2018 | Fu et al. |
| 2006/0174802 | A1 | 8/2006 | Bedel et al. |
| 2007/0137528 | A1 | 6/2007 | Le Roy-Delage et al. |
| 2008/0017376 | A1* | 1/2008 | Badalamenti .......... C09K 8/487 166/292 |
| 2009/0071650 | A1 | 3/2009 | Roddy et al. |
| 2010/0298175 | A1* | 11/2010 | Ghassemzadeh ...... C09K 8/516 507/124 |
| 2012/0205106 | A1 | 8/2012 | Le Roy-Delage et al. |
| 2012/0312535 | A1 | 12/2012 | Michaux et al. |
| 2012/0325476 | A1 | 12/2012 | Brenneis et al. |
| 2013/0037267 | A1 | 2/2013 | Regnault De La Mothe et al. |
| 2014/0166285 | A1 | 6/2014 | Santra et al. |
| 2015/0129217 | A1 | 5/2015 | Vorderbruggen et al. |
| 2015/0267103 | A1 | 9/2015 | Medvedev |
| 2016/0032169 | A1 | 2/2016 | Chew et al. |
| 2016/0122620 | A1 | 5/2016 | Fu et al. |
| 2016/0264842 | A1 | 9/2016 | Miller et al. |
| 2017/0174975 | A1 | 6/2017 | De Stefano et al. |
| 2017/0267911 | A1 | 9/2017 | Morris et al. |
| 2018/0215989 | A1* | 8/2018 | Jain .......... C09K 8/467 |
| 2018/0230358 | A1* | 8/2018 | Jain .......... C09K 8/467 |
| 2019/0145223 | A1 | 5/2019 | Van Oort et al. |
| 2019/0316025 | A1 | 10/2019 | Sherman et al. |
| 2020/0002596 | A1 | 1/2020 | Sodhi et al. |

FOREIGN PATENT DOCUMENTS

| | | |
|---|---|---|
| EP | 2025732 A1 | 2/2009 |
| EP | 2457974 A1 | 5/2012 |
| EP | 2004569 B1 | 5/2013 |
| RU | 2452849 C1 | 6/2012 |
| WO | 2004009956 A1 | 1/2004 |
| WO | 2004076810 A1 | 9/2004 |
| WO | 2005123871 A2 | 12/2005 |
| WO | 2014011071 A1 | 1/2014 |
| WO | 2015069293 A1 | 5/2015 |
| WO | 2016069293 A1 | 5/2016 |
| WO | 2016073257 A1 | 5/2016 |
| WO | 2017023159 A1 | 2/2017 |
| WO | 2017087263 A1 | 5/2017 |
| WO | 2020264271 A1 | 12/2020 |
| WO | 2020264288 A1 | 12/2020 |
| WO | 2020264289 A1 | 12/2020 |

OTHER PUBLICATIONS

International Search Report and Written Opinion issued in International Patent Application No. PCT/US2020/039811 dated Oct. 19, 2020; 11 pages.
Hao et al., "Comparative study on cementation of cement-mudcake interface with and without mud-cake-solidification-agents application in oil & gas wells", Journal of Petroleum Science and Engineering 147 (2016), pp. 143-153.
Schlemmer et al., "Drilling Fluid Conversion: Selection and Use of Portland or Blast-Furnace-Slag Cement", SPE Drilling & Completion, SPE26324, Dec. 1994, pp. 249-255.
Mueller et al., "Blast Furnace Slag Technology: Features, Limitations, and Practical Applications", Society of Petroleum Engineers, SPE28475, Sep. 1994, pp. 117-129.
Leimkuhler et al., "Downhole Performance Evaluation of Blast Furnace Slag-Based Cements: Onshore and Offshore Field Applications", Society of Petroleum Engineers, SPE28474, Sep. 1994, pp. 101-116.
Liu et al., "Solidification of Synthetic-Based Drilling Mud Using Geopolymers", Society of Petroleum Engineers, SPE180325, Sep. 2016, 13 pages.
International Search Report and Written Opinion issued in International Patent Application No. PCT/US2020/039812 dated Oct. 22, 2020; 12 pages.
International Search Report and Written Opinion issued in International Patent Application No. PCT/US2019/039720 dated Oct. 23, 2019; 13 pages.
API RP-10B, Testing of Well Cements Used in Deepwater Well Construction, API Recommended Practice 10B, 22nd Edition Dec. 1997, 167 pages.
Bell, S., "Mud-to-Cement Technology Converts Industry Practices," Petroleum Engineer International, Sep. 1993, v. 65, No. 9, pp. 51-55.
Economides, M. J., Nolte, K. G., (eds ): Reservoir Stimulation—3rd Edition, Chichester, John Wiley Sons Ltd., 2000, Chapter 3.
Nahm et al., Slag mix mud conversion cementing technology: Reduction of mud disposal volumes and management of rig-site drilling wastes, Journal of Petroleum Science and Engineering, vol. 11, No. 1, 1994, pp. 3-12.
Nelson EB and Guillot D (eds.): Well Cementing, 2nd Edition, Houston, Schlumberger, 2006, title page—table of contents, 22 pages, Only Table of Contents Considered.
Shchurenko, et al., Features of the Well Test Interpretation in Complicated Conditions of Intensive Segregation of Phases in the Wellbore and the Manifestation of the Effects of Abnormal Pressure Growth, SPE-191561-18RPTC-MS, presented at the SPE Russian Petroleum Technology Conference, Moscow, Russia, Oct. 2018, published Oct. 15, 2018, 24 pages.
Extended Search Report issued in EP Patent Application No. 19831198.7 dated Mar. 15, 2022, 8 pages.
Office Action and Search Report issued in Russian patent application 2021102174 dated Dec. 21, 2021, 11 pages.
Decision on Grant issued in Russian patent application 2021102174 dated Mar. 21, 2023, 17 pages.
Office Action issued in U.S. Appl. No. 17/621,875 dated May 12, 2023, 7 pages.

(56) References Cited

OTHER PUBLICATIONS

Office Action issued in U.S. Appl. No. 17/621,875 dated Jul. 24, 2023, 20 pages.

* cited by examiner

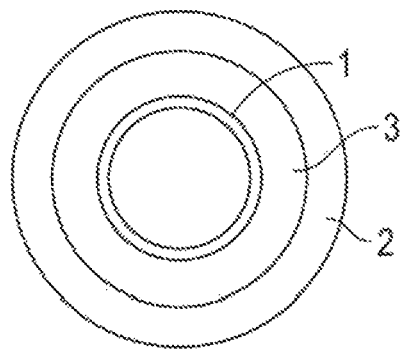 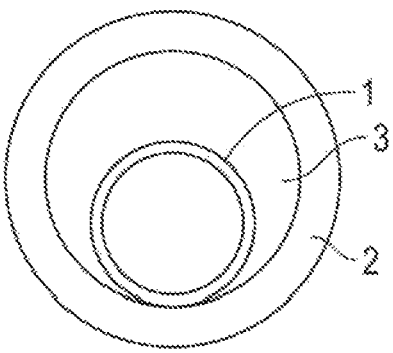
FIG. 1A　　　　　　　　　　FIG. 1B
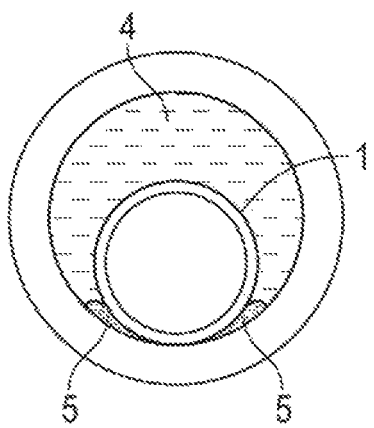
FIG. 2
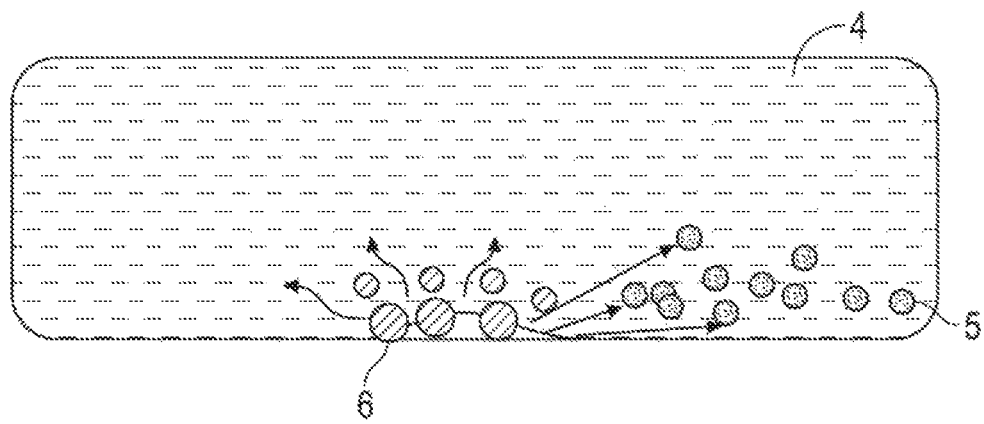
FIG. 3

CEMENT COMPOSITIONS AND METHODS

CROSS-REFERENCE TO RELATED APPLICATION

This application is a nonprovisional application that claims the benefit of U.S. Provisional application No. 62/693,173, filed on Jul. 2, 2018, entitled "Cement Compositions and Methods."

TECHNICAL FIELD

The present disclosure relates generally to cement systems. In particular, the disclosure relates to cement systems that contact drilling fluids within a subterranean well.

BACKGROUND

The statements in this section merely provide background information related to the present disclosure and may not constitute prior art.

During the construction of a subterranean well it is common, during and after drilling, to place a tubular body (e.g., liner or casing) in the well, secured by cement pumped into the annulus around the outside of the liner. The cement supports the tubular body and provides hydraulic isolation of the various fluid-producing zones through which the well passes. This latter function is important because it prevents fluids from different layers contaminating each other. For example, the cement prevents formation fluids from entering the water table and polluting drinking water, or prevents water production instead of oil or gas. A complete discussion of cementing techniques may be found in the following publication. Nelson EB and Guillot D (eds.): *Well Cementing* —2nd Edition, Houston, Schlumberger (2006).

Drilling fluid removal has been a subject of interest in the well-cementing community for many years because of its effect on cement quality and zonal isolation. The principal objective of a primary cement job is to provide complete and permanent isolation of the formations behind the casing. To meet this objective, the drilling mud and the preflushes (if any) should be fully removed from the annulus, and the annular space must be completely filled with cement slurry. Once in place, the cement may harden and develop the necessary mechanical properties to maintain a hydraulic seal throughout the life of the well. Therefore, efficient mud removal and proper slurry placement promote well isolation.

Incomplete removal of drilling fluids within a wellbore may affect the quality of hydraulic cement placement in the wellbore annulus resulting in incomplete zonal isolation. This may occur particularly in horizontal wellbores where poorly centralized casing may increase the likelihood that gelled mud channels may form. Compromised zonal isolation may increase the potential for fluid flow along the casing at applied pressure gradient. Later in the life of the well, such mud channels that have formed may serve as non-productive communication pathways between stages during a stimulation treatment.

The present disclosure provides well cementing systems that may provide additional zonal isolation by facilitating the removal or dispersion of residual drilling fluids, such as non-aqueous drilling fluids, within the wellbore. Further, the cement compositions disclosed herein may interact with residual drilling fluids and alter the properties of such drilling fluids. The present disclosure is particularly directed to drilling fluids, such as non-aqueous drilling fluids which range from diesel- or mineral oil-based fluids to synthetic-based systems. Synthetic-based systems may contain synthetic hydrocarbons, ethers, esters or acetals. The synthetic hydrocarbons may include linear paraffins, linear-α-olefins, poly-α-olefins and internal olefins. The synthetic-based systems may be emulsions in which the hydrocarbon is the external phase.

SUMMARY

In an aspect, embodiments relate to methods for cementing a subterranean well. A cement slurry may be prepared comprising water, a hydraulic cement and particles of an oil-absorbing material, wherein the particles are present in an amount sufficient to interact with a non-aqueous component of a drilling fluid and alter a property of the drilling fluid within the subterranean well. The cement slurry is placed in the subterranean well, causing the oil-absorbent material particles to contact the non-aqueous drilling fluid component, thereby altering the property of the non-aqueous component.

In a further aspect, embodiments relate to methods for establishing zonal isolation in a subterranean well. A cement slurry may be prepared comprising water, a hydraulic cement and particles of an oil-absorbent material, wherein the particles are present in an amount sufficient to interact with a non-aqueous component of a drilling fluid and alter a property of the drilling fluid within the subterranean well. The cement slurry is placed in the subterranean well wherein residual drilling fluid is present along casing and formation surfaces, causing the oil-absorbent material particles to contact the residual drilling fluid, thereby altering the property of the non-aqueous component and creating a hydraulic seal in the subterranean well.

BRIEF DESCRIPTION OF THE DRAWINGS

FIG. 1A is a cross-sectional diagram depicting 100% casing centralization in a wellbore, according to the present disclosure.

FIG. 1B is a cross-sectional diagram depicting eccentric casing centralization, which may occur in deviated or horizontal well sections, according to the present disclosure.

FIG. 2 is a cross-sectional diagram depicting a drilling fluid channel arising from poor casing centralization in a wellbore, according to the present disclosure.

FIG. 3 is a diagram depicting a drilling fluid channel that has been deposited in the narrow region of an eccentric annulus and affected by a cement slurry of the present disclosure.

DETAILED DESCRIPTION

Figure 4:
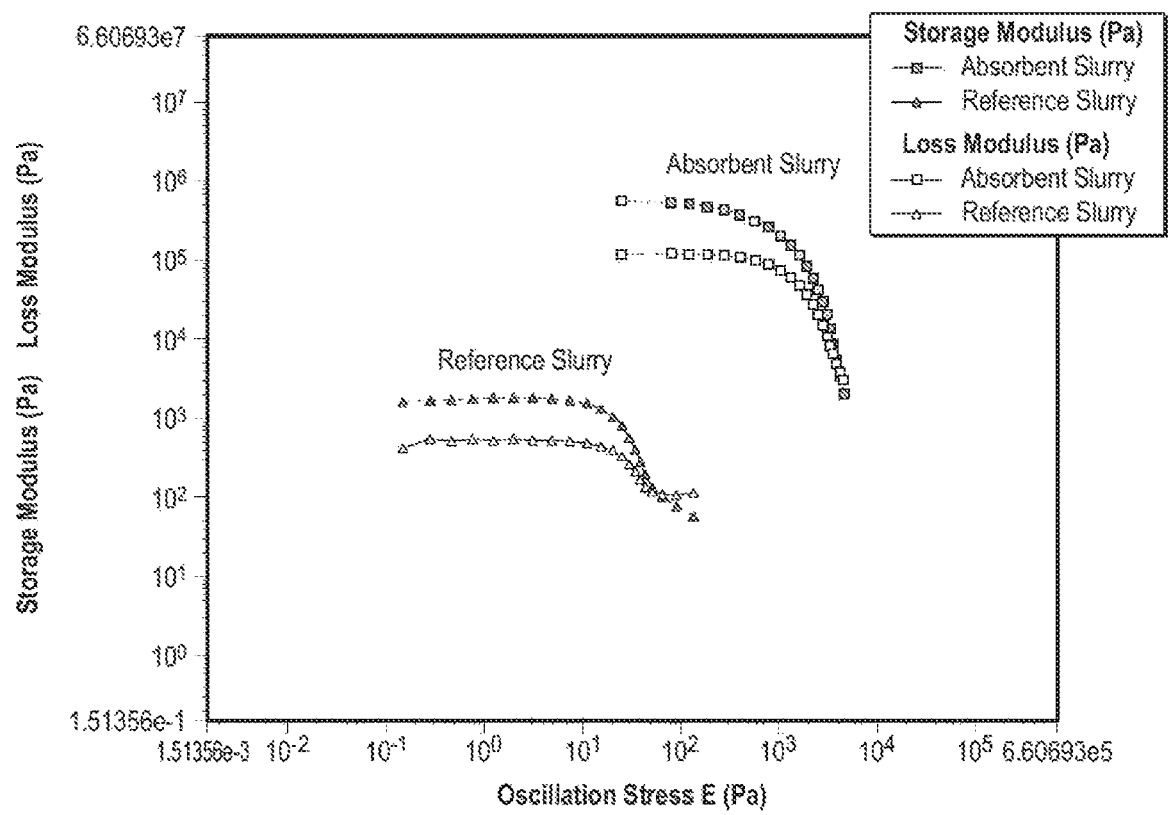
FIG. 4 compares the rheological properties of diesel-based emulsion drilling fluids after exposure to cement slurries. The yield point of a drilling fluid exposed to a cement slurry containing oil-absorbent particles was larger than that of a drilling fluid exposed to a comparative slurry that did not contain absorbent particles. The crossover points (stress) where the loss modulus was equal to the storage modulus were the fluids' yield points.

At the outset, it should be noted that in the development of any such actual embodiment, numerous implementations, such as specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

As discussed earlier, one indication of successful cement placement is complete drilling fluid removal. Complete removal of non-aqueous drilling fluids, for example, may be challenging because such drilling fluids may leave casing and formation surfaces oil wet, which may negatively affect cement sheath bond quality. It is known in the art that such drilling fluids may further contain clays, weighting agents or both.

During most cementing operations, casing 1 is present inside a wellbore having a wall 2. An annulus 3 is therefore present between the casing and the wellbore wall. Optimal drilling-fluid removal may occur when the casing is fully centralized in the wellbore (FIG. 1*a*). 100% casing centralization maximizes circulation efficiency because there are no narrow regions that may be resistant to fluid flow. However, achieving 100% casing centralization may not be achievable in deviated or horizontal well sections (FIG. 1*b*). Due to gravity, the casing has a tendency to migrate toward a borehole wall. As a result, during the cement placement process, when cement slurry 4 is pumped to fill the annulus, the eccentric casing position may lead to poor drilling-fluid displacement in the narrow portion of the casing/wellbore annulus, leaving a drilling-fluid channel 5 (FIG. 2).

The present disclosure presents methods for altering drilling-fluid properties as well as achieving zonal isolation. Embodiments may combat drilling fluid channels by interacting with the drilling fluid channels and altering properties of the drilling fluid channels.

In an aspect, embodiments relate to methods for cementing a subterranean well. A cement slurry may be prepared comprising water, a hydraulic cement, and particles of an oil-absorbing material, wherein the particles are present in an amount sufficient to interact with a non-aqueous component of a drilling fluid and alter a property of the drilling fluid within the subterranean well. The cement slurry may be placed in the subterranean well, causing the oil-absorbent material particles to contact the non-aqueous drilling fluid component, thereby altering the property of the non-aqueous component. The cement slurry may have a density between 8 lbm/gal and 25 lbm/gal, or between 10 lbm/gal and 24 lbm/gal.

In a further aspect, embodiments relate to methods for establishing zonal isolation in a subterranean well. A cement slurry may be prepared comprising water, a hydraulic cement, and particles of an oil-absorbent material, wherein the particles are present in an amount sufficient to interact with a non-aqueous component of a drilling fluid and alter a property of the drilling fluid within the subterranean well. The cement slurry is placed in the subterranean well wherein residual drilling fluid is present along casing and formation surfaces, causing the oil-absorbent material particles to contact the residual drilling fluid, thereby altering the property of the non-aqueous component and creating a hydraulic seal in the subterranean well.

In an embodiment, an oil-absorbing material may be added to the cement slurry. The oil-absorbing material may begin interacting with drilling fluid first at the interface between the drilling fluid and cement. Not being bound to any theory, the oil absorbing material may promote oil diffusion into the set cement material. Once oil from oil-based drilling fluid is absorbed or diffused into the cement, the rheological properties of the drilling fluid may change. Consequently, the drilling fluid may be converted from a fluid-like material to a paste-like structure. Such conversion inside the drilling-fluid channel may prevent fluid flow inside the channel and serve to provide zonal isolation. In addition, oil-absorbing particles in the cement sheath may increase in size, physically blocking small channels or compressing a paste-like mud structure.

The oil-absorbent material may comprise rubber, ground rubber, acrylonitrile butadiene, styrene butadiene, 2,1 bicycloheptene, alkylstyrene, or crosslinked substituted vinyl acetate copolymer, combinations thereof, or the like.

In an embodiment, a process contributing to achieving zonal isolation may include dynamic removal of the mud channel during cement slurry displacement. The oil-absorbing particles 6 flowing near the drilling fluid channel may physically remove a portion of the drilling fluid 5 and transport the portion away from the drilling fluid channel. Thus, the particles may significantly reduce the size of the drilling fluid channel or even remove it (FIG. 3).

In an embodiment, a material that viscosifies oil may be added to the cement slurry. Oil-viscosifying particles may interact and diffuse into oil-based drilling fluid during placement or after the cement setting process, and viscosify the residual oil-based mud to an extent that zonal isolation is achieved. Such cement compositions may contain a sufficient concentration of oil-viscosifying particles to increase the yield point (Ty) to a level higher than that of cement compositions that do not contain the oil-viscosifying particles. The yield point increase may take place within three days of exposure, and the ultimate yield point measured by oscillatory rheometry may be at least 100 Pa. In some cases, the yield point may rise to 4600 Pa (see Example 3). Or the yield point may be between 500 Pa and 3000 Pa. Or the yield point may be between 1000 Pa and 2000 Pa. The higher the yield point, the better the zonal isolation may be. Thus, one of the properties that may be altered by the non-aqueous component of the drilling fluid is flowability, and the oil-absorbent material decreases the flowability of the non-aqueous component. The particle size of the block polymer particles may have a D90 of about 1 μm to 850 μm, or a D90 of about 300 μm to 800 μm.

For all embodiments, the cement slurry may comprise portland cement, high alumina cement, fly ash, blast furnace slag, microcement, geopolymers, chemically bonded phosphate ceramics, plaster or resins or combinations thereof. The cement slurry further comprises polymers, random copolymers and block polymers comprising alternating sections of one chemical compound separated by sections of a different chemical compound, or a coupling group of low molecular weight. For example, block polymers may have the structure (A-b-B-b-A), wherein A represents a block that is glassy or semi-crystalline and B is a block that is elastomeric. In principle, A can be any polymer that is normally regarded as thermoplastic (e.g., polystyrene, polymethylmethacrylate, isotactic polypropylene, polyurethane, etc.), and B can be any polymer that is normally regarded as elastomeric (e.g., polyisoprene, polybutadiene, polyethers, polyesters, etc.). Example thermoplastic block polymers include styrene-isoprene-styrene (SIS), styrene-butadiene-styrene (SBS) and mixtures thereof. The block-polymer-additive may be in one or more shapes, including (but not limited to) spherical, ovoid, fibrous, ribbon-like and in the form of a mesh. The tensile strength of the block polymer may vary between, but not be limited to, about 1.5 MPa and 40 MPa, or between 3.4 to 34 MPa, or between 2 MPa and 3.45 MPa or between 28 MPa and 34 MPa. The thermoplastic block polymers may be present in the cement slurry at a concentration between about 5 lbm/bbl and 50 lbm/bbl. The abbreviation "bbl" stands for barrels. One barrel equals 42 US gallons. Or the block polymer may be present in the cement slurry at a concentration 8 lbm/bbl and 15 lbm/bbl. The particle size of the block polymer particles may be between about 1 μm and 850 μm, or between 300 μm and 800 μm.

The thermoplastic block-particles may be further associated with one or more compounds from the list comprising an emulsion of polymer comprising a betaine group, poly-2, 2, 1-bicyclo heptene (polynorbornene), alkylstyrene, cross-linked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene-butadiene rubber, styrene/propylene/diene monomer, brominated poly(isobutylene-co-4-methylstyrene), butyl rubber, chlorosulfonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulfonated polyethylene, fluoro silicone rubbers, fluoroelastomers, substituted styrene acrylate copolymers and bivalent cationic compounds.

In addition to the aforementioned particles, the cement slurries may also comprise customary additives such as retarders, accelerators, extenders, fluid-loss-control additives, lost-circulation additives, gas-migration additives, gas-generating additives, expansion additives and antifoam agents. Furthermore, the cement slurries may contain additives that enhance the flexibility and/or toughness of the set cement. Such additives include, but are not limited to, flexible particles having a Young's modulus below about 5000 MPa and a Poisson's ratio above about 0.3. Such particles may have a Young's modulus below about 2000 MPa. Examples include, but are not limited to, non-swellable polypropylene, non-swellable polyethylene, acrylonitrile butadiene, styrene butadiene and polyamide. Such additives may also include non-swellable fibers selected from the list comprising polyamide, polyethylene and polyvinyl alcohol. Metallic microribbons may also be included.

In an embodiment, the oil-absorbent particles may be elongated, fibrous, cylindrical or asymmetrical. Such particles with an aspect ratio higher than about 1 may interact and form an interconnected network inside the cement slurry. The elongated shape may also improve the absorbing ability of the particles. The higher aspect ratio increases the probability that the particles will contact each other throughout the cement slurry, allowing more efficient oil absorption and lower absorbent-particle concentrations to achieve a given result.

The particle aspect ratio may be between 1.1 and 2000, or 10 and 1500, or 15 and 1000 before swelling, and between 2.2 and 3500, or 4 and 1000, or 6 and 350 after swelling.

Furthermore, the temperature at which the disclosed fluids operate may be between 80° F. and 400° F., or between 100° F. and 375° F.

For all embodiments, the concentration of oil-absorbent particles may vary in the cement sheath. This may be accomplished by varying the rate at which the oil-absorbent particles are added to the cement slurry during mixing and pumping. Certain portions of the cement sheath may not contain oil-absorbent particles. As long as there are regions along the cement sheath providing zonal isolation, the well as a whole may have a hydraulic seal. For example, sections containing the oil-absorbent particles may be located above and below producing zones. Under these circumstances, the concentration of the oil-absorbent particles may vary between 0% and 40% by weight of cement. This approach may be more economical than scenarios where the oil-absorbent particles are present throughout the cement sheath.

EXAMPLES

Example 1—Drilling Fluid Rheological Properties

Two 600-mL cement slurries were prepared in a Waring blender according to a mixing procedure published by the American Petroleum Institute (RP-10B). The density of both slurries was 15 lbm/gal (1800 kg/m$^3$). Both slurries were prepared with Texas Lehigh Class H cement.

A comparative slurry composition is given in Table 1.

TABLE 1

| Comparative cement slurry composition. | |
|---|---|
| Additive | Concentration |
| Acrylamido-methyl-propane sulfonate (AMPS)/ Acrylamide copolymer | 0.3% BWOC |
| Sodium Polynaphthalene Sulfonate | 0.1% BWOC |
| Polysaccharide Biopolymer | 0.3% BWOC |
| Polypropylene Glycol | 0.050 gal/sk |
| Water | 6.02 gal/sk |

BWOC = by weight of cement;
sk = 94-lb sack of portland cement.
AMPS = 2-acrylamido-2-methylpropane sulfonic acid.

A cement composition according to the disclosure is given in Table 2. The cement slurry contained absorbing particles composed of ground rubber particles. The particle size of the rubber varied between 100 μm and 800 μm.

TABLE 2

Cement slurry composition according to the disclosure.

| Additive | Concentration |
|---|---|
| Ground Rubber | 31.0% BVOB |
| Barium Sulfate | 8.4% BVOB |
| Crystalline Silica | 15% BVOB |
| AMPS/Acrylamide copolymer | 0.3% BWOC |
| Sodium Polynaphthalene Sulfonate | 0.4% BWOC |
| Polysaccharide Biopolymer | 0.8% BWOC |
| sodium glucoheptonate/crystalline silica/hematite | 0.5% BWOC |
| Polypropylene Glycol | 0.1 gal/sk |
| SIS Copolymer | 1% BWOB |
| Water | 4.27 gal/sk |

BWOB = by weight of blend;
BVOB = by volume of blend;
SIS = styrene-isoprene-styrene Both slurries were conditioned for 35 min at 168° F. in an atmospheric consistometer. A representative 13 lbm/gal (1620 kg/m³) inverse emulsion drilling fluid was chosen that contained diesel as the continuous phase (MegaDril™, available from Schlumberger). 15 mL of the conditioned slurry were placed at the bottom of a glass vial. 5 mL of the drilling fluid was carefully added to the top of the conditioned slurry. The glass vials were placed in a Turbiscan AGS instrument (available from Formulaction Inc., Worthington, Ohio) that was preheated to 140° F. (60° C.) and allowed to cure for 8 days. During this time the slurry developed compressive strength, and the drilling fluid in contact with the slurry containing the absorbent particles increased its yield strength compared to that in contact with the comparative cement system. To quantify this rheological change, the drilling fluids were extracted from the vials. The yield strength was analyzed on a TA-DHR3 rheometer (available from TA Instruments, New Castle, Del.) in a parallel plate configuration. An oscillatory amplitude sweep was conducted at 68° F. (20° C.) with an angular frequency of 10 rad/s and a logarithmic strain percent sweep from 0.01% to 100%. The drilling fluid that was exposed to the absorbent slurry exhibited a yield strength in some cases approximately 65 times higher than that of the drilling fluid exposed to the comparative slurry under the same conditions (FIG. 4)

Example 2—Channel Flow Reduction

Applicant developed a laboratory method to investigate the ability of absorbent containing cement slurry to reduce fluid flow in a drilling-fluid filled channel. Two 600-mL cement slurries were prepared in a Waring blender. The cement was Class H portland cement. The density of both slurries was 14.5 lbm/gal (1740 kg/m³). Both slurries were extended with fly ash.

A comparative slurry composition is given in Table 3.

TABLE 3

Comparative cement slurry Composition.

| Additive | Concentration |
|---|---|
| Fly ash | 40 lb/sk |
| AMPS/Acrylamide copolymer | 0.3% BWOB |
| Sodium Polynaphthalene Sulfonate | 0.3% BWOB |
| Polysaccharide Biopolymer | 0.3% BWOB |
| Silica Fume | 8.0% BWOB |

TABLE 3-continued

Comparative cement slurry Composition.

| Additive | Concentration |
|---|---|
| Sodium Lignosulfonate | 0.3% BWOB |
| Polypropylene Glycol | 0.050 gal/sk |
| Water | 5.91 gal/sk |

A slurry composition according to the disclosure is given in Table 4.

TABLE 4

Cement slurry composition according to the disclosure.

| Additive | Concentration |
|---|---|
| Fly ash | 40 lb/sk |
| AMPS/Acrylamide copolymer | 0.3% BWOB |
| Sodium Polynaphthalene Sulfonate | 0.1% BWOB |
| Polysaccharide Biopolymer | 0.3% BWOB |
| Polypropylene Glycol | 0.050 gal/sk |
| Sodium Lignosulfonate | 0.3% BWOB |
| Silica Fume | 8.0% BWOB |
| Ground Rubber | 5.0% BWOC |
| SIS Copolymer | 1% BWOB |
| Water | 5.60 gal/sk |

A 3-in. long by 1-in. wide steel pipe was capped on one end and filled with slurry and then capped on the other end. Small vent holes were added to the caps to equalize the pressure during high pressure curing. The pipes containing slurry were loaded into a curing chamber and were exposed to 170° F. (77° F.) and 3000 psi (21 MPa). After the slurry had set, a hole was drilled in the cement leaving a channel of about ⅛-in. (0.3-cm) diameter. The bottom of the hole was plugged, the channel was filled with 13-lbm/gal (1620-kg/m³) MegaDril™ drilling fluid, and was allowed to set for 6 days at atmospheric conditions. The permeability of the resulting mud channel was probed by the flow of water through the channel. The flow rate was set at 1 mL/min and resulting pressure were measured using a Teledyne ISCO D-series syringe pump.

Figure 5:
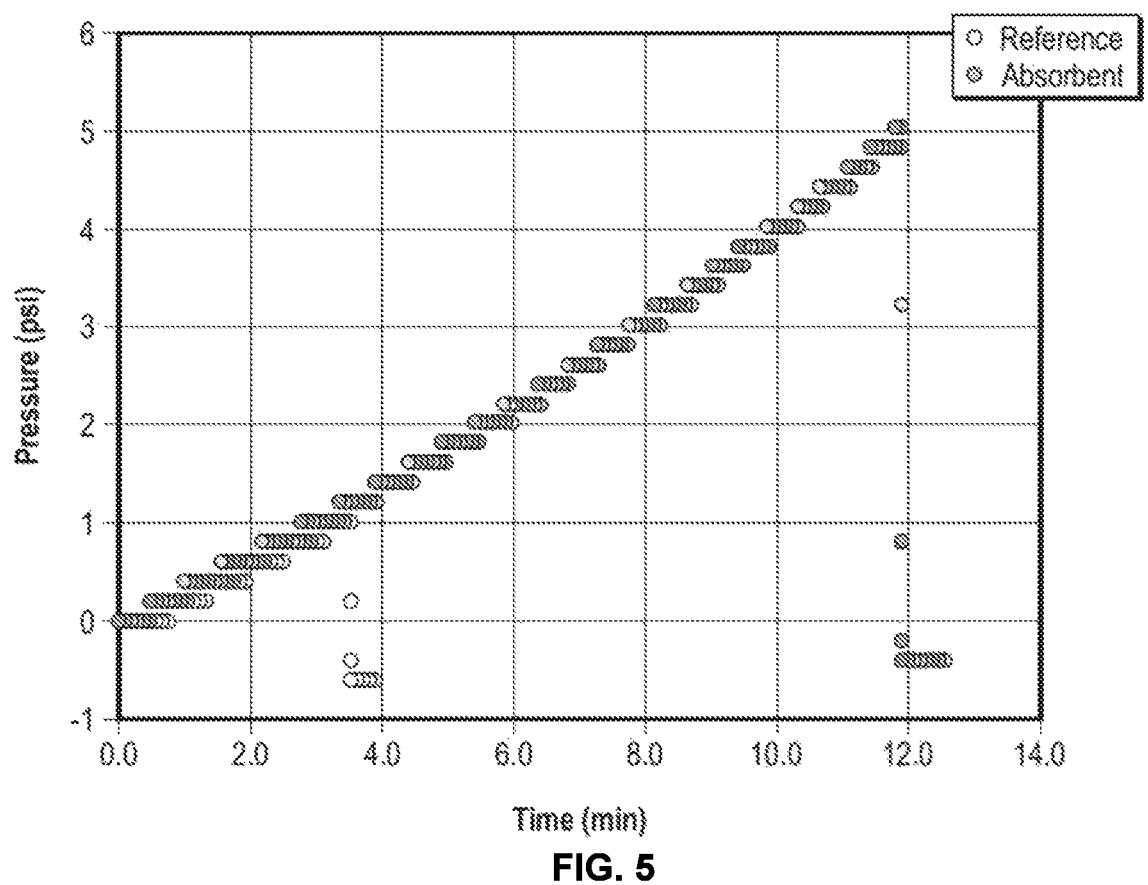
FIG. 5 depicts pressure test results for a conventional cement slurry and a cement slurry containing oil-absorbing particles.

The results, presented in FIG. 5, show that the cement prepared according to the present disclosure was 5 times more pressure resistant compared to the comparative cement. The absorbent additive concentration could be adjusted to increase pressure even higher, up to 14 psi, if needed. In order to scale the laboratory results to a real application, it could be calculated that 5 psi in a 3-in. tube corresponds to 3000 psi at a 50-ft distance.

During another experiment, a 5-in. long by 1-in. wide steel pipe was capped on one end and filled with slurry. Then a 3.175 mm diameter wooden dowel was placed in the setting cement slurry. After 24 hours the dowel was removed and 13-lbm/gal (1620-kg/m³) MegaDril™ drilling fluid was injected. The interaction time between the drilling fluid and the cement slurry was 3 days. The permeability of the resulting mud channel was probed by flowing water through the channel using a Teledyne ISCO D-series syringe pump. A 14.5-lbm/gal slurry (Table 5) containing rubber particles was shown to hold a pressure of 4.58 psi/in (average of 6 duplicate runs) while a similar control 14.5 lbm/gal system (Table 6), held 0.48 psi/in (average of 3 duplicate runs).

TABLE 5

Cement slurry composition according to the disclosure.

| Additive | Concentration | |
|---|---|---|
| Fly ash | 40 | lb/sk |
| AMPS/Acrylamide copolymer | 0.15% | BWOB |
| Sodium Polynaphthalene Sulfonate | 0.5% | BWOB |
| Polysaccharide Biopolymer | 0.2% | BWOB |
| Silica Fume | 8.0% | BWOB |
| Ground Rubber | 5% | BWOC |
| Polypropylene Glycol | 0.050 | gal/sk |
| Water | 5.65 | gal/sk |

TABLE 6

Comparative cement slurry composition.

| Additive | Concentration | |
|---|---|---|
| Fly ash | 40 | lb/sk |
| AMPS/Acrylamide copolymer | 0.15% | BWOB |
| Sodium Polynaphthalene Sulfonate | 0.5% | BWOB |
| Polysaccharide Biopolymer | 0.2% | BWOB |
| Silica Fume | 8.0% | BWOB |
| Polypropylene Glycol | 0.050 | gal/sk |
| Water | 5.66 | gal/sk |

Example 3—Oil Viscosification

The ability of an absorbent particle to viscosify oil was investigated. The absorbent particles were made of polystyrene-block-poly(ethylene-ran-butylene)-block-polystyrene and polystyrene-block-polybutadiene-block-polystyrene polymers (manufactured by Sigma-Aldrich Chemie GmbH, Steinheim, Germany). The oil was LVT200 oil, a hydrotreated light distillate manufactured by Deep South Chemical, Inc., Broussard, La.

Figure 6:
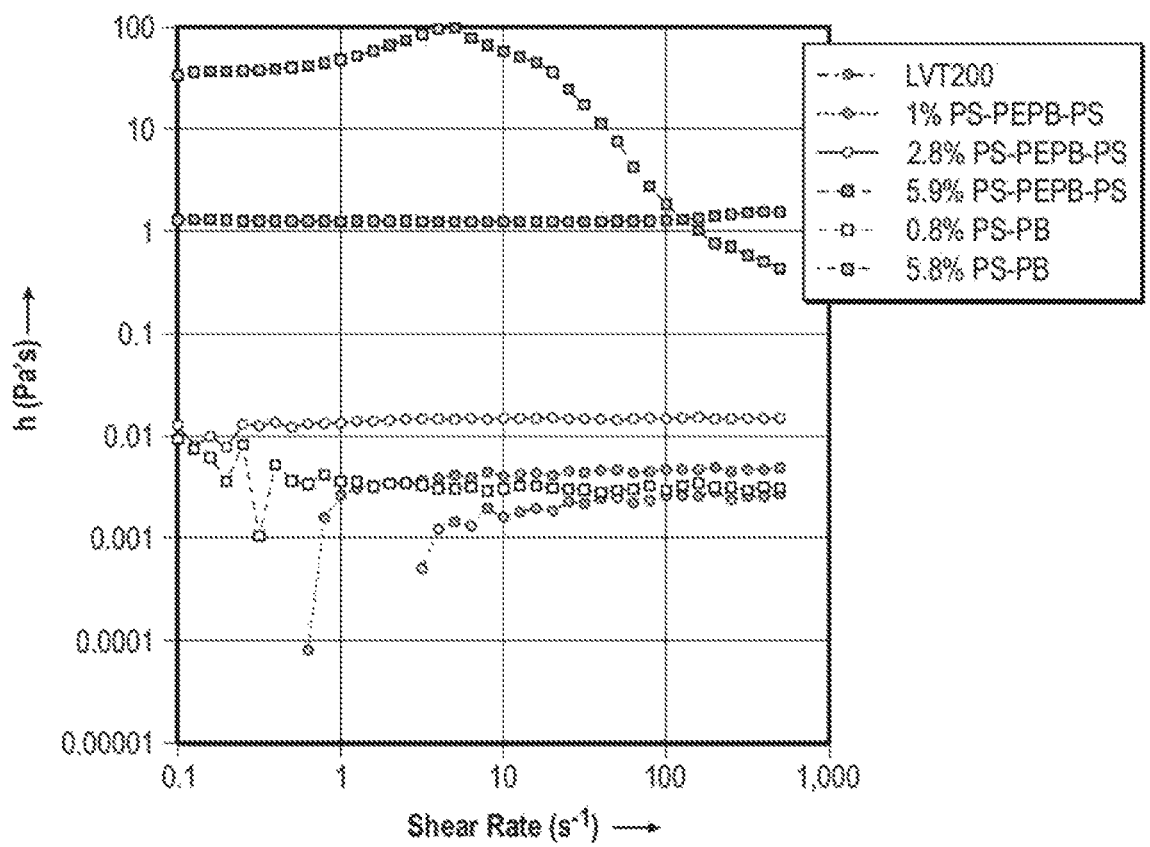
FIG. 6 depicts the viscosities of oils containing various oil-absorbent polymers.

The following samples were investigated: 0.8 wt % and 5.8 wt % solutions of polystyrene-block-polybutadiene-block-polystyrene polymer (PS-PB) in LVT200 oil and 1 wt %, 2.8 wt %, 5.9 wt % solutions of polystyrene-block-poly(ethylene-ran-butylene)-block-polystyrene polymer (PS-PEPB-PS) in LVT200. The viscosities of samples were measured by MCR300 rheometer from Anton Paar in parallel plate CC17 geometry (FIG. 6). The results show that the oil viscosities increase with polymer concentration.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method for cementing a subterranean well, comprising:
preparing a cement slurry comprising water, a hydraulic cement and particles of an oil-absorbent material, wherein the particles absorb a non-aqueous component of a drilling fluid and alter rheological properties of the drilling fluid within the subterranean well, and wherein an amount of the oil-absorbent material particles varies, in portions of the cement slurry, between 0% by weight of the cement (BWOC) and 40% BWOC;
placing the cement slurry in the subterranean well and thereby creating a cement sheath in the subterranean well with a variable oil-absorbent material amount;
allowing the oil-absorbent material particles to contact the non-aqueous drilling fluid component, thereby altering the rheological properties of the drilling fluid and swelling the oil-absorbent material particles;
wherein the oil-absorbent material particles are elongated, having an aspect ratio between 1.1 and 2000 before the swelling and between 2.2 and 3500 after the swelling.

2. The method of claim 1, wherein the oil-absorbent material comprises rubber, ground rubber, acrylonitrile butadiene, styrene butadiene, 2,1 bicycloheptene, alkylstyrene, or crosslinked substituted vinyl acetate copolymer, or combinations thereof.

3. The method of claim 1, wherein the oil-absorbent material particles have a particle size between 1 μm and 850 μm.

4. The method of claim 1, wherein the rheological properties of the drilling fluid altered by contact with the oil-absorbent material particles comprise flowability, and wherein the oil-absorbent material particles decrease the flowability of the drilling fluid.

5. The method of claim 1, wherein the elongated particles interact in the subterranean well to form an interconnected network.

6. The method of claim 1, wherein the oil-absorbent material particles are present in an amount between 5 lbm/bbl and 50 lbm/bbl.

7. The method of claim 1, wherein the cement slurry has a density between 10 lbm/gal and 24 lbm/gal.

8. The method of claim 1, wherein the non-aqueous component comprises diesel, mineral oil, olefins, esters, synthetic paraffins, or refined paraffins, or combinations thereof.

9. A method for establishing zonal isolation in a subterranean well, comprising:
preparing a cement slurry comprising water, a hydraulic cement, and particles of an oil-absorbent material, wherein the particles absorb a non-aqueous component of a residual drilling fluid present in the subterranean well along casing and formation surfaces thereof and alter rheological properties of the residual drilling fluid within the subterranean well, and wherein an amount of the oil-absorbent material particles varies, in portions of the cement slurry, between 0% by weight of the cement (BWOC) and 40% BWOC;
placing the cement slurry in the subterranean well and thereby creating a cement sheath in the subterranean well with a variable oil-absorbent material amount;
allowing the oil-absorbent material particles to contact the residual drilling fluid, thereby altering the rheological properties of the drilling fluid and swelling the oil-absorbent material particles, wherein the oil-absorbent material particles are elongated, having an aspect ratio between 1.1 and 2000 before the swelling and between 2.2 and 3500 after the swelling.

10. The method of claim 9, wherein the oil-absorbent material comprises rubber, ground rubber, acrylonitrile butadiene, styrene butadiene, 2,1bicycloheptene, alkylstyrene, or crosslinked substituted vinyl acetate copolymer, or combinations thereof.

11. The method of claim 9, wherein the oil-absorbent material particles have a particle size between 1 μm and 850 μm.

12. The method of claim 9, wherein the rheological properties of the drilling fluid altered by contact with the oil-absorbent material particles comprise flowability, and wherein the oil-absorbent material particles decrease the flowability of the drilling fluid.

13. The method of claim 9, wherein the elongated particles interact in the subterranean well to form an interconnected network.

14. The method of claim 9, wherein the oil-absorbent material particles are present in an amount between 5 lbm/bbl and 50 lbm/bbl.

15. The method of claim 9, wherein the cement slurry has a density between 10 lbm/gal and 24 lbm/gal.

16. The method of claim 9, wherein the non-aqueous component comprises diesel, mineral oil, olefins, esters, synthetic paraffins, or refined paraffins, or combinations thereof.

* * * * *